US006670973B1

(12) United States Patent
Hill et al.

(10) Patent No.: US 6,670,973 B1
(45) Date of Patent: Dec. 30, 2003

(54) SYSTEM AND METHOD FOR REPRESENTING THE INFORMATION TECHNOLOGY INFRASTRUCTURE OF AN ORGANIZATION

(75) Inventors: Thomas L. Hill, Dallas, TX (US); Kevin J. Rammage, Plano, TX (US)

(73) Assignee: Electronic Data Systems Corporation, Plano, TX (US)

( * ) Notice: Subject to any disclaimer, the term of this patent is extended or adjusted under 35 U.S.C. 154(b) by 0 days.

(21) Appl. No.: 09/342,481

(22) Filed: Jun. 29, 1999

(51) Int. Cl.[7] ................................................. G09G 5/00
(52) U.S. Cl. ........................ 345/853; 345/854; 345/855; 345/839; 345/835; 705/7; 705/8; 705/9
(58) Field of Search ................................. 345/853, 854, 345/855, 839, 835, 966, 734, 736, 737, 440

(56) References Cited

U.S. PATENT DOCUMENTS 5,864,865 A * 1/1999 Lakis ......................... 707/103
6,128,016 A * 10/2000 Coelho et al. ............... 345/347
6,407,761 B1 * 6/2002 Ching et al. ................. 345/835

* cited by examiner

Primary Examiner—Kristine Kincaid
Assistant Examiner—Mylinh Tran
(74) Attorney, Agent, or Firm—Baker Botts LLP (57) ABSTRACT

A computer program for representing the information technology infrastructure of an organization includes an interactive display module and an output module. The interactive display module can generate a hierarchical list of information technology elements and organizational elements in the information technology infrastructure of the organization and can generate an interactive user interface that presents the hierarchical list. The output module can generate a hierarchical graph of the information technology infrastructure of the organization. The hierarchical list and the hierarchical graph each represent the information technology infrastructure of the organization.

13 Claims, 5 Drawing Sheets

SYSTEM AND METHOD FOR REPRESENTING THE INFORMATION TECHNOLOGY INFRASTRUCTURE OF AN ORGANIZATION

TECHNICAL FIELD OF THE INVENTION

This invention relates to information technology, and more particularly to a system and method for representing the information technology infrastructure of an organization.

BACKGROUND OF THE INVENTION

Organizations typically have a large number and variety of information technology elements, such as software applications, subsystems, and databases, which together make up the information technology system of the organization. Moreover, many of these information technology elements are used by various elements in the organization, such as sales, accounting, and engineering departments.

Unfortunately, the relationships between the various information technology elements and their uses by different organizational elements, which together constitute the information technology infrastructure of the organization, are normally hidden from decision makers. A time consuming review of source code may be undertaken to determine the relationships between the information technology elements and their usage in each organizational element. This review may reveal that the information technology infrastructure is quite complex and difficult to characterize or represent.

SUMMARY OF THE INVENTION

The present invention substantially reduces or eliminates at least some of the disadvantages and problems associated with representing the information technology infrastructure of an organization. To accomplish this, the present invention provides representations of the information technology infrastructure of an organization in interactive and graphical formats that are readily discernible and technically useful.

In one embodiment of the present invention, a computer program embodied in a computer readable media for representing the information technology infrastructure of an organization includes an interactive display module and an output module. The interactive display module is operable to generate a hierarchical list of information technology elements and organizational elements in the information technology infrastructure of an organization and to generate an interactive user interface that presents the hierarchical list. The output module is operable to generate a hierarchical graph of the information technology infrastructure of the organization. The hierarchical list and the hierarchical graph each represent the information technology infrastructure of the organization.

In another embodiment, a method performed on a computer for representing the information technology infrastructure of an organization includes storing data representing information technology elements of an organization, organizational elements of the organization, and relationships between the information technology elements and the organizational elements. The method also includes generating a hierarchical list of the information technology elements and the organizational elements for presentation by an interactive user interface, wherein the hierarchical list represents the information technology infrastructure of the organization. The method further includes displaying the interactive user interface that presents the hierarchical list on a display device.

The present invention has several important technical features and advantages. First, by generating the interactive user interface that presents the hierarchical list of the information technology elements and the organizational elements of the organization, the relationships between the information technology elements and the organizational elements in the information technology infrastructure are readily discernible and modifiable. Modifications can include rearranging the hierarchical order of the information technology elements in the hierarchical list, moving the information technology elements between different organizational elements in the hierarchical list, adding information technology elements to the hierarchical list, and deleting information technology elements from the hierarchical list. Second, by generating a hierarchical graph of the information technology infrastructure, the information technology infrastructure of the organization is placed in a format that is readily presentable to and usable by others.

In a particular embodiment, the hierarchical graph will include a label for each occurrence of an information technology element that occurs more than once in the hierarchical graph. Each label will locate each occurrence of the information technology element in the hierarchical graph. The hierarchical graph will also include cross-references at each occurrence of the information technology element to the other occurrences of the information technology element in the hierarchical graph. This cross-referencing allows ready identification of high dependency sectors in the information technology infrastructure of the organization, and identifying high dependency sectors assists in determining which sectors to focus on during compliance testing, upgrades and enhancements, and general flow testing.

Other technical advantages will be readily apparent to one skilled in the art from the following figures, description, and claims.

BRIEF DESCRIPTION OF THE DRAWINGS

For a more complete understanding of the present invention, and for further features and advantages, reference is now made to the following description taken in conjunction with the accompanying drawings, where like reference numerals represent like parts, in which.

DETAILED DESCRIPTION OF THE INVENTION

Figure 1:
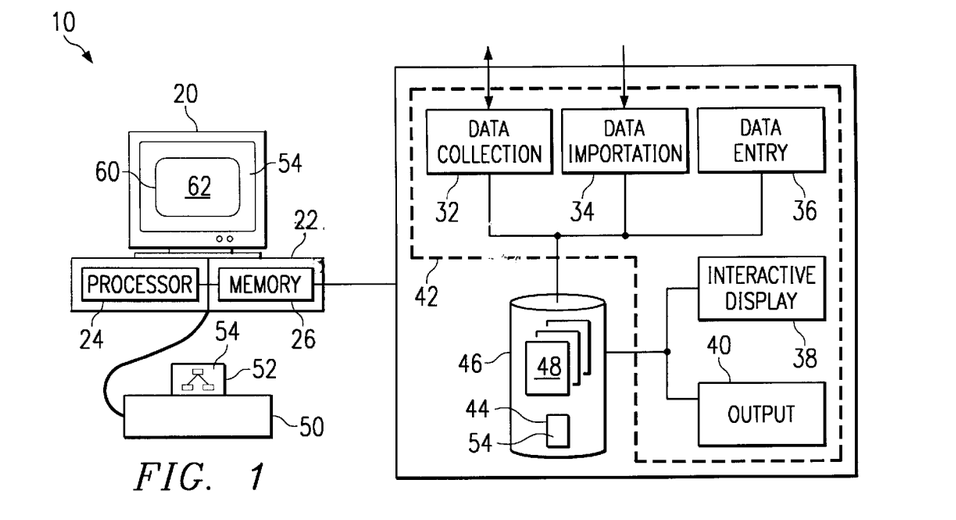
FIG. 1 provides an overview of a system for representing the information technology infrastructure of an organization.

FIG. 1 provides an overview of a system 10 for representing the information technology infrastructure of an organization. System 10 includes a display device 20, a processing device 22, and an output device 50. Processing device 22 generates a hierarchical list 62 and a hierarchical graph 54, each of which represents the information technology infrastructure of the organization, and can be a personal computer (PC), a workstation, a mainframe, an integrated circuit (IC), or any other device that can electronically process data. Display device 20 displays hierarchical list 62 and/or hierarchical graph 54 and can be a cathode ray tube (CRT) display, a liquid crystal display (LCD), a flat-panel display (FPD), or any other device that can display an electronic image. Output device 50 generates a hard copy output 52 that presents hierarchical graph 54 and can be a laser printer, an ink jet printer, a fax machine, a plotter, or any other type of device that can generate a hard copy output of an electronic image.

To generate hierarchical list 62 and hierarchical graph 54, processing device 22 includes a processor 24 and a memory 26. Memory 26 stores representations of the information technology elements of the organization, the organizational elements of the organization, and the relationships between the information technology elements and the organizational elements. The information technology elements, the organizational elements, and the relationships between them form the information technology infrastructure of the organization. Memory 26 can be random access memory (RAM), a hard drive, a diskette, a CD-ROM, another type of magnetic or optical storage device, or any other volatile or non-volatile memory.

Memory 26 includes a computer program 42 and a database 46, which processor 24 uses in generating hierarchical list 62 and hierarchical graph 54. Computer program 42, executable by processor 24, includes a data collection module 32, a data importation module 34, a data entry module 36, an interactive display module 38, and an output module 40. Database 46 includes data files 48, each of which contains data representing the information technology elements, the organizational elements, and the relationships between them for an information technology infrastructure. Database 46 can have any type, format, or arrangement of information, as described above with respect to memory 26. Also, data files 48 may be one or more flat files, relational files, or other suitable arrangement of information.

In operation, data collection module 32, data importation module 34, and/or data entry module 36 allow computer program 42 to obtain data that represents the information technology elements, the organizational elements, and the relationships between them. Once obtained, computer program 42 can store the data in database 46 as one of data files 48. Data collection module 32 performs auto-discovery of the information technology system of the organization to locate and identify the information technology elements. Data collection module 32 can perform this function autonomously and automatically by searching the information technology system for information technology elements, polling the information technology elements, and gathering information about the information technology elements. Data collection module 32 can use any network management protocol to perform this function, such as, for example, simple network management protocol (SNMP), remote monitoring (RMON) protocol, or common management information protocol (CMIP). Data importation module 34, on the other hand, imports data from a preexisting database or data file into computer program 42. Data importation module 34 may perform this function by accessing a preformatted database or data file or by automatically parsing an unformatted database and placing the data into the proper format. Data entry module 36 accepts data directly entered by a user of computer program 42.

After computer program 42 acquires and stores the representations of the information technology elements, the organizational elements, and the relationships between them for the particular information technology infrastructure, interactive display module 38 generates hierarchical list 62 of the information technology elements and organizational elements of the organization for presentation by an interactive user interface 60 on display device 20. Interactive user interface 60 can be a graphical user interface (GUI), a command-driven user interface, a textual character-based user interface, or any other type of user interface that can present data to a user and allow the user to manipulate the data. Interactive user interface 60 allows a user of computer program 42 to modify the relationships between the information technology elements and the organizational elements, as well as the elements themselves.

Once interactive display module 38 finishes performing the modifications to hierarchical list 62 and saves any modifications of the data used to form hierarchical list 62 to one of data files 48, output module 40 can generate hierarchical graph 54 of the information technology infrastructure of the organization in memory location 44. After this, output module 40 can display hierarchical graph 54 on display device 20 and/or cooperate with output device 50 to generate hard copy output 52 that presents hierarchical graph 54.

Note, although computer program 42 is shown as having several modules, the modules may be combined or further subdivided in numerous manners while still providing the same functionality in system 10. Also, data files 48 may be one or more flat files, relational files, or other suitable arrangement of information.

As illustrated in FIG. 1, system 10 has several features and advantages. Because interactive user interface 60 can present hierarchical list 62 of the information technology elements and the organizational elements of the organization, system 10 allows ready discernment and modification of the relationships between the information technology elements and the organizational elements in the information technology infrastructure. Moreover, interactive user interface 60 allows insertion of information technology elements into and deletion of information technology elements from hierarchical list 62. In addition, because display device 20 can display and/or hard copy output 52 can present hierarchical graph 54 of the information technology infrastructure of the organization, system 10 provides a view of the information technology infrastructure of the organization that is readily discernible and usable by others.

Figure 2:
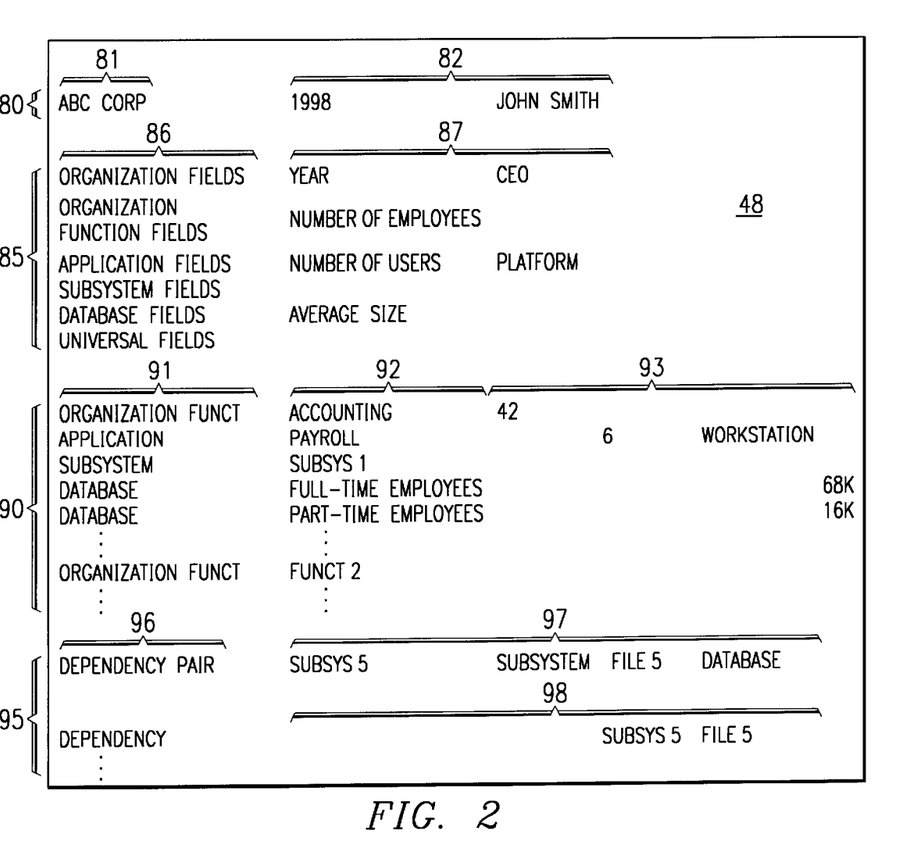
FIG. 2 provides an example of a data file for use in the system.

FIG. 2 provides an example of one of data files 48 stored in database 46 for use in system 10. As illustrated, data file 48 is a text file in which the fields in each record are tab delimited. Also, data file 48 uses five levels to represent the information technology infrastructure of the organization—organization, organization function, application, subsystem, and database. The first two levels correspond to organizational elements, and the last three levels correspond to information technology elements. Thus, each level corresponds to a different element type.

The records in data file 48 are collated into four groups: an organization group 80, a properties group 85, an element group 90, and a dependency group 95. Organization group 80 includes a record that contains identification information about the organization. Properties group 85 includes records that specify labels for the different properties associated with each element type—organization, organization function, application, subsystem, and database. For example, if the number of users needs to be associated with each application, the label "NUMBER OF USERS" would be inserted in properties group 85 in the record for applications ("APPLICATION FIELDS"). Note, the first fields of the records, except for the last record, in properties group 85 define the levels used to represent the information technology infrastructure. Thus, for data file 48, there are five levels, but in other embodiments, more or fewer levels could be used to represent the information technology infrastructure. Further note, the records in properties group 85 could be in any order. Element group 90 includes records that specify the organizational elements, the information technology elements, and the relationships between them, as well as any properties of each information technology element and organizational element. The order of the records in element group 90 specifies the relationships between the organizational elements and the information technology elements, and the labels in properties group 85 define the properties that can be specified for each element type. Finally, dependency group 95 includes records that specify dependencies between information technology elements and between information technology elements and organizational elements.

In organization group 80, an organization field 81 of the record includes the title for the data, which is usually the name of the organization. Organization information fields 82 of the record of organization group 80 include additional information about the organization. As illustrated, a number and a name are in organization information fields 82, the context of which depend on the labels in properties group 85.

Properties group 85 includes records that specify labels for the different properties associated with each type of information technology element and organizational element—organization, organization function, application, subsystem, and database. Note, each element type corresponds to a level used to represent the information technology infrastructure. An element field 86 of each record in properties group 85 associates the labels with a type of information technology element or organizational element, except for the last ("UNIVERSAL FIELDS"), which can be used for all element types. For example, "ORGANIZATION FIELDS" corresponds to the element type "organization," described in organization group 80. Label fields 87 specify the labels for the properties associated with each element type in element field 86. Label fields 87 can allow any number of labels with which to denote the properties for the information technology elements and organizational elements. Continuing with the above example, the labels for the first two fields of organization information fields 82 in organization group 80 are "YEAR" and "CEO." The next four records in properties group 85 associate labels with organizational elements and information technology elements in element group 90. For example, the labels associated with the element type "application" are "NUMBER OF USERS" and "PLATFORM." The last record in properties group 85 contains labels for use with any element type. Note, the records in properties group 85 could be in any order.

Element group 90 includes records that specify the information technology elements, the organizational elements, the relationships between the elements, and the properties of the elements. An element type field 91 in each record of element group 90 contains an element type—organization function, application, subsystem and database. Note, as illustrated, the element types in element type field 91 correspond with the entries in element field 86 for the second through fifth records of properties group 85. After specifying an element type in element type field 91, an element is given an element name in a name field 92. For example, the first organization function is named "ACCOUNTING." Following the name for the element type are the properties in properties fields 93, corresponding to the labels in label fields 87 for that element type. For example, the element type "ORGANIZATION FUNCTION" in element group 90 corresponds with "ORGANIZATION FUNCTION FIELDS" in properties group 85, and thus, the property specified in properties fields 93 for an organization function is the number of employees in that organization function, forty-two for the organization function "ACCOUNTING." In a particular embodiment, each field in properties fields 93 is unique to one of the labels in label fields 87, except for the labels for "ORGANIZATION FIELDS," used in organization group 80.

Following the specification of an organization function in the first record of element group 90 are the information technology elements in the organization function. For example, the organization function "ACCOUNTING" may have an application that it uses to compute payroll, as illustrated by the second record in element group 90. Thus, the information technology elements in an organization function can be broken down from the more general to the more specific, which would be the database. Following the records for the information technology elements associated with the first organization function is the record for the second organization function. The process continues for that organization function.

Dependency group 95 includes records that specify dependencies between certain information technology elements and between certain information technology elements and organizational elements. By specifying dependencies between certain elements, an element that is dependent on another element will always have the other element connected to it in hierarchial list 62 and hierarchical graph 54, no matter where or how many times the dependent element occurs.

Dependency group 95 provides two ways to associate elements. The first way is by using the keyword "DEPENDENCY PAIR" in a dependency type field 96. By specifying this keyword, the name given to the higher level element, found in name field 92 of element group 90, will be the first entry in dependency fields 97. The name of the higher level element will be followed by the element type associated with the higher level element, found in element type field 91 of element group 90. The next entry in dependency fields 97 will be the name of the lower level element, found in name field 92, followed by the element type, found in element type field 91. Thus, as illustrated, the first record of dependency group 95 specifies a dependency relationship between "Subsys 5" and "File 5." In a particular embodiment, this dependency exists because "Subsys 5" uses "File 5" to perform its functions.

A second way to associate two elements is enabled by using the keyword "DEPENDENCY" in dependency type field 96. In this case, dependency fields 98 contain the name of the organization function, the name of the application, the name of the subsystem, and/or the name of the database in the dependency chain. Inserting the names of the elements in the dependency chain in dependency fields 98 specifies the dependency. As an example, the second record of dependency group 95 shows an alternative way to create a dependency relationship between "File 5" and "Subsys 5." Note, in other embodiments, dependency group 95 could use only one of the ways described, or a different way, to specify associated elements.

Although data file 48 is tab-delimited, data file 48 could be delimited by a comma, space, semi-colon, colon, or other suitable character. In addition, the format illustrated in example data file 48 is not rigid but merely illustrative. The records could be arranged in different orders or collated in different groups. Moreover, the information in each record could be modified. Thus, system 10 generally contemplates any organization or structure of data file 48 to specify one or more organizational elements, one or more information technology elements, and their relationships.

Figure 3A:
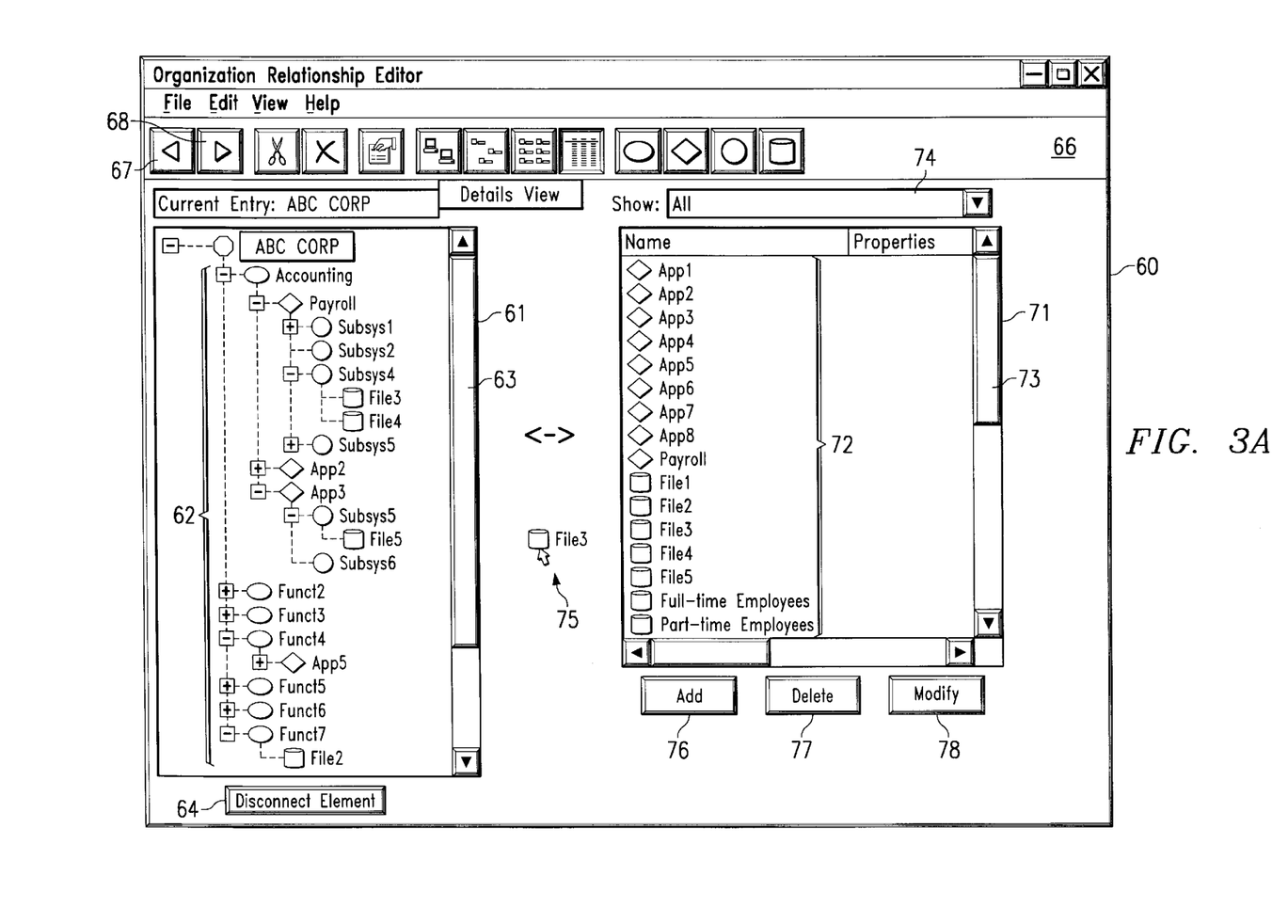
FIG. 3A illustrates an interactive user interface that presents a hierarchical list of the information technology infrastructure.

FIG. 3A illustrates interactive user interface 60 that presents hierarchical list 62 of the information technology elements and the organizational elements. In this illustration, interactive user interface 60 is a GUI. Interactive user interface 60 includes a section 61 and a section 71.

Section 61 presents hierarchical list 62, which is illustrated as a tree diagram. Each level in hierarchical list 62 corresponds to one of the element types of the organization—organization, organization function, application, subsystem, or database and, hence, is a level used to represent the information technology infrastructure. To assist in presenting this representation of the information technology information infrastructure, hierarchical list 62 can expand and contract at each information technology element and each organizational element. Also, if hierarchical list 62 is too large to fit within section 61, a toolbar 63 will allow scrolling through hierarchical list 62.

Interactive user interface 60, through interactive display module 38, allows modification of the relationships between the information technology elements and the organizational elements in hierarchical list 62 presented by section 61. Also, an information technology element or organizational element can be disconnected from hierarchical list 62 when one of the elements is selected and a button 64 is activated. Note, disconnecting an element from hierarchical list 62 that has elements connected below it in the hierarchy will also disconnect the elements below the disconnected element from hierarchical list 62.

Section 71 provides a listing 72 of all the information technology elements and the organizational elements specified in data file 48. Listing 72 presented by section 71 is grouped by element type and arranged alphabetically in each group. Section 71 of interactive user interface 60 can present either all or some of the information technology elements and the organizational elements based on a pull-down menu 74. For example, pull-down menu 74 can specify whether to display either a group of information technology elements, based on element type, all of the information technology elements, or all of the information technology elements and the organizational elements, as illustrated. If section 71 does not have enough space to present all of the information technology elements and/or the organizational elements, a toolbar 73 will allow scrolling through the elements in section 71. In a particular embodiment, the properties of the information technology elements and the organizational elements may be presented to the side of each element in section 71.

There are several ways to modify listing 72 presented by section 71. Upon activation of a button 77, interactive user interface 60 will allow the deletion of one of the information technology elements or the organizational elements from listing 72. In addition, interactive user interface 60 allows modification of the properties of the information technology elements and the organizational elements already presented by section 71 upon activation of a button 78. The properties available for an information technology element or an organizational element are determined by the labels for that element type in properties group 85 in data file 48, as will be discussed with respect to FIG. 3B. Thus, for the element type "APPLICATION" named "PAYROLL," interactive user interface 60 will allow modification of the number of users or the platform used upon activation of button 78. Upon activation of a button 76, interactive user interface 60 will allow the addition of a new information technology element or a new organizational element to section 71.

Figure 3B:
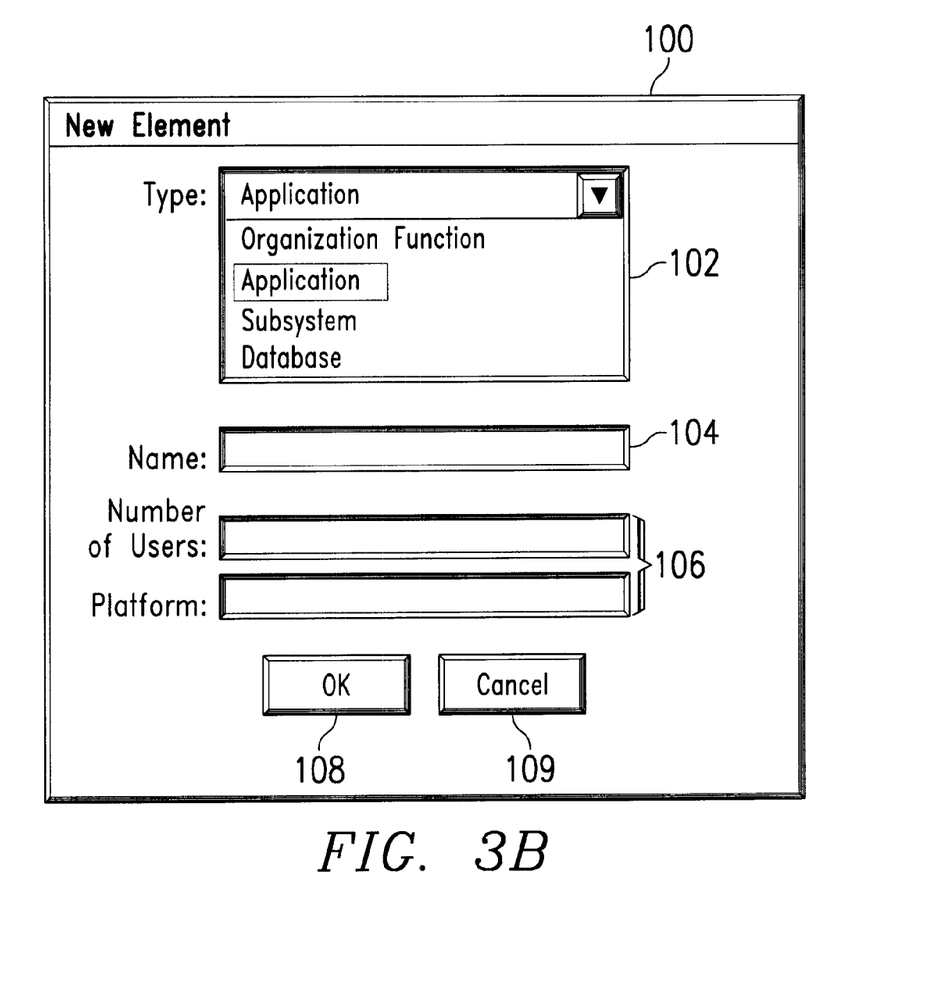
FIG. 3B illustrates an entry screen for adding an information technology element or an organizational element to the interactive user interface.

FIG. 3B illustrates an entry screen 100 for adding an information technology element or an organizational element to listing 72 presented by section 71 of interactive user interface 60. Note, entry screen 100 is itself an interactive user interface. Entry screen 100 appears when computer program 42 detects activation of button 76. A pull-down menu 102 dictates the element type to be added to listing 72. Upon selection of an element type in pull-down menu 102, computer program 42 displays a box 104 in which to input the name of the new element, which corresponds to name field 92 of data file 48, and boxes 106 in which to input the properties of the element. Note, label fields 87 for the element type specified in pull-down menu 102 determine the number of and labels for boxes 106. Computer program 42 allows departure from entry screen 100 when at least an element type and a name have been specified in pull-down menu 102 and box 104, respectively, and a button 108 is activated or when a button 109 is activated, whereby no element will be added to listing 72.

Returning to FIG. 3A, system 10 will also allow insertion of an information technology element or an organizational element presented by interactive user interface 60 in section 71 into hierarchical list 62 presented by interactive user interface 60 in section 61. This may be accomplished, for example, using a drag and drop technique with a pointing device, through keyboard commands, or through any other type of command input technique. In a particular embodiment, if the inserted element is now beneath an element in hierarchical list 62 that has multiple occurrences in hierarchical list 62, computer program 42 will copy the inserted element to each occurrence of the higher level element in hierarchical list 62.

In certain embodiments, interactive display module 38 will allow modifications to interactive user interface 60 according to click, drag, and drop techniques. For example, when computer program 42 detects a double click on one of the information technology elements or the organizational elements in hierarchical list 62, computer program 42 will contract or expand hierarchical list 62 at that element. Also, when computer program 42 detects highlighting of and a click upon one of the information technology elements presented by section 71 of interactive user interface 60, computer program 42 will copy the highlighted information technology element, illustrated by an icon 75, and show the movement of the copy in response to the movement of an input pointing device, such as a mouse. When computer program 42 detects that icon 75 is over one of the information technology elements or organizational elements in hierarchical list 62, computer program 42 will highlight the information technology element or organizational element in hierarchical list 62 if the connection is proper. The connection is complete when computer program 42 detects an unclick signal from the input device. Moreover, computer program 42 will allow the use of a similar technique to move information technology elements and organizational elements already presented by section 61 within hierarchical list 62. In addition, if computer program 42 detects a right click on one of the elements, it will present a menu of edit commands, such as for viewing the properties of the element.

In embodiments where dependencies between information technology elements are specified, if an information technology element inserted into hierarchical list 62 is dependent on any other information technology element, the other information technology element will automatically be connected to the inserted element in hierarchical list 62.

Interactive display module 38 provides shortcuts in a toolbar 66 for many of the previously mentioned operations, such as disconnecting elements in hierarchical list 62, deleting elements in listing 72, and viewing the properties of the elements. Buttons 67 and 68 allow forward and backward searches through hierarchical list 62 presented by section 61 to find multiple occurrences of an element. Interactive display module 38 will perform such a search when it detects selection of an element in hierarchical list 62 or in listing 72 and activation of button 67 or button 68. Interactive display module 38 will then find the previous or the next occurrence of that element in hierarchical list 62, respectively. It may also list (in a separate view) all dependencies for the selected element.

Once hierarchical list 62 in interactive user interface 60 accurately represents relationships between the information technology elements and the organizational elements of the organization, computer program 42 saves the data presented by interactive user interface 60 in data file 48, like the one shown in FIG. 2. Then, computer program 42 can generate hierarchical graph 54.

Figure 4:
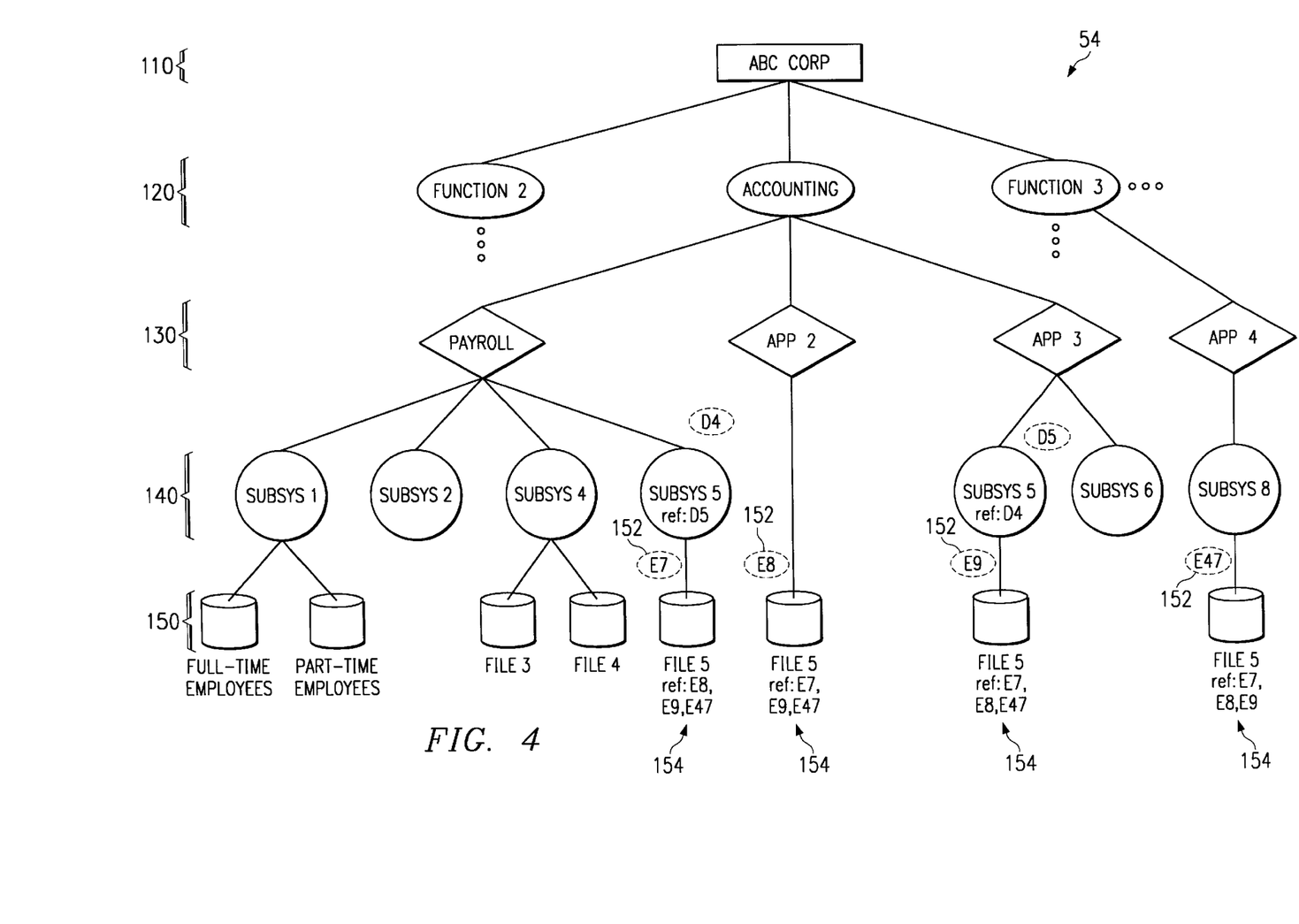
FIG. 4 illustrates a hierarchical graph of the information technology infrastructure of the organization.

FIG. 4 illustrates hierarchical graph 54 of the information technology infrastructure of the organization. As illustrated, hierarchical graph 54 uses a five-level hierarchical order to represent the information technology infrastructure of the organization, corresponding to the five levels specified in data file 48 in FIG. 2. A first level 110 and a second level 120 correspond to the organizational elements of the organization—organization and organizational function, respectively. A third level 130, a fourth level 140, and a fifth level 150 correspond to the information technology elements of the organization—application, subsystem, and database, respectively.

In general, hierarchical graph 54 corresponds with hierarchical list 62 in interactive user interface 60. However, hierarchical graph 54 shows each information technology element and organizational element in the information technology infrastructure, whether visible in section 61 of interactive user interface 60 or not. Note, the names of the information technology elements and of the organizational elements in hierarchical graph 54 correspond with the names used in hierarchical list 62.

Output module 40 generates hierarchical graph 54 in memory location 44. Output module 40 can then display hierarchical graph 54 on display device 20 or cooperate with output device 50 to generate hard copy output 52, which presents hierarchical graph 54.

In certain embodiments, each occurrence of an information technology element that has multiple occurrences in hierarchical graph 54 has a unique label. In addition, each occurrence includes cross-references to the other occurrences of the information technology element in hierarchical graph 54. For example, in fifth level 150, database "File 5" is shown to occur four times in the information technology infrastructure of the organization. Each occurrence of "File 5" is identified by a label 152 at the upper left hand corner, which specifies the location of the occurrence in hierarchical graph 54 in a two-dimensional grid. In the example, each level of the information technology infrastructure corresponds to a letter and each element on that level corresponds to a number. Each occurrence of "File 5" also has cross-references 154 at the bottom to the other occurrences of "File 5.". By providing cross-references 154 between information technology elements that have multiple occurrences in the information technology infrastructure of the organization, high dependency sectors of the information technology infrastructure are readily discernible throughout the information technology infrastructure. The identification of these high dependency sectors assists in determining where to focus during compliance testing, upgrades and enhancements, and general flow testing. Note, in other embodiments, every occurrence of every element in hierarchical graph 54 has a unique label. Also in other embodiments, label 152 may locate the elements in hierarchical graph 54 by other manners than a two-dimensional grid.

In a particular embodiment, output module 40 displays hierarchical graph 54 on display device 20 in a graphics program that allows the specification of the spacing, labeling, and other display options. In addition, each element type may be given a different icon, as illustrated in FIG. 4. System 10 may then generate hard copy output 52 that presents modified hierarchical graph 54.

Figure 5:
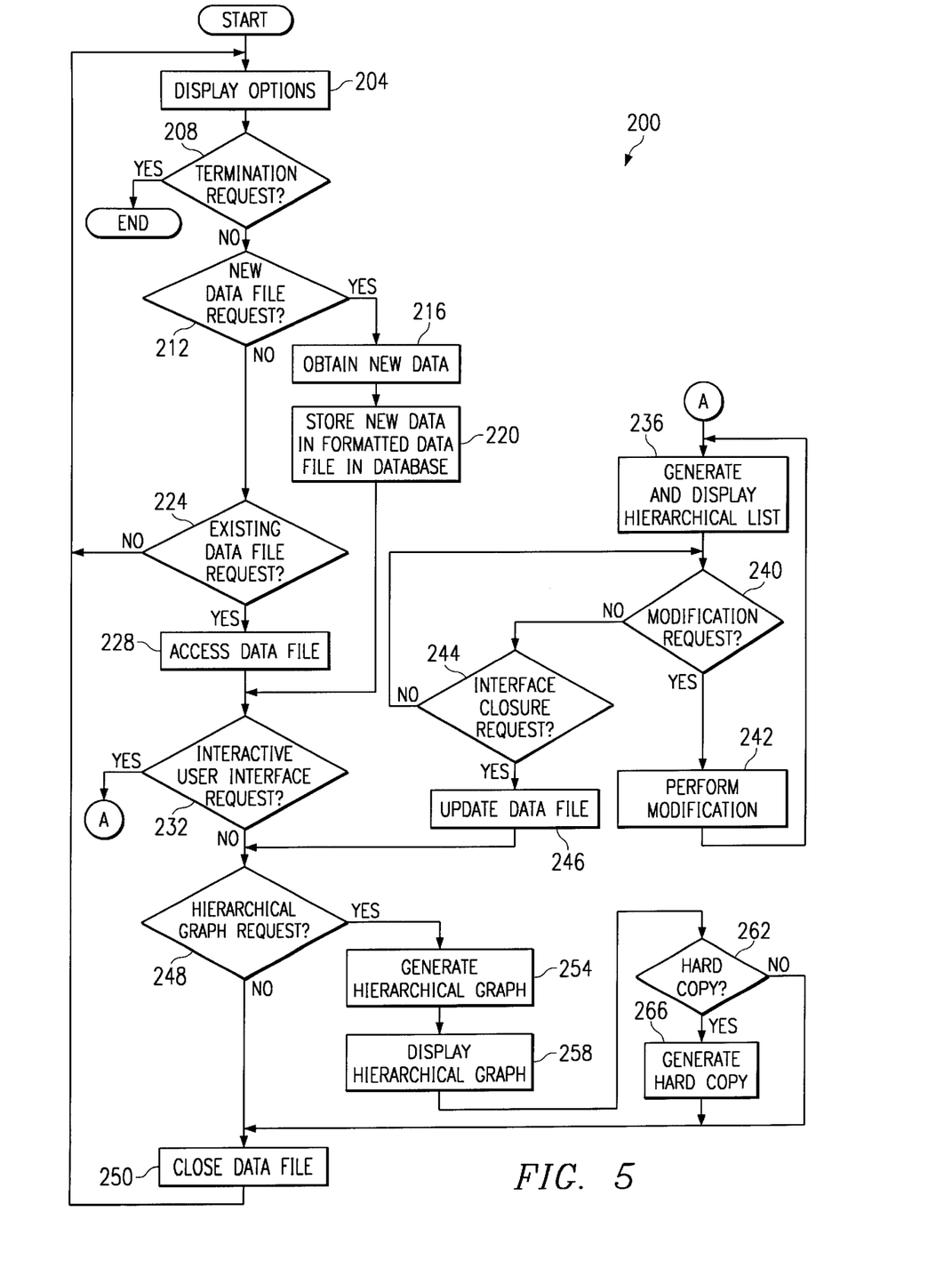
FIG. 5 shows a flowchart of a method for representing the information technology infrastructure of an organization.

FIG. 5 shows a flowchart 200 of a method for representing the information technology infrastructure of an organization. At step 204, computer program 42 displays a series of options. If computer program 42 detects a termination request at step 208, computer program 42 terminates.

However, if computer program 42 does not detect a termination request at step 208, computer program 42 determines whether there is a request for a new data file at step 212. If there is a request for a new data file at step 212, computer program 42 obtains new data at step 216, using data collection module 32, data importation module 34, and/or data entry module 36. Then, at step 220, computer program 42 stores this data as data file 48 in database 46. Once step 220 is complete, computer program 42 proceeds to step 232. Returning to step 212, if there is no request for a new data file, computer program 42 determines whether there is a request to access an existing data file 48 in database 46 at step 224. If there is no request to access an existing data file 48 at step 224, computer program 42 proceeds to step 204 to re-display options to the user. If, however, there is a request to access an existing data file 48 at step 224, computer program 42 accesses requested data file 48 in database 46 at step 228 and proceeds to step 232.

If computer program 42 detects a request for interactive user interface 60 at step 232, computer program 42 generates hierarchical list 62 of the information technology elements and the organizational elements of the organization, generates interactive user interface 60 that presents hierarchical list 62, and displays interactive user interface 60 at step 236. If computer program 42 then detects a request for a modification to hierarchical list 62 at step 240, such as adding elements, deleting elements, or modifying their properties and/or relationships, computer program 42 performs this modification at step 242. Computer program 42 will then re-generate and re-display hierarchical list 62 of the modified relationship between the information technology elements and the organizational elements at step 236. This may continue while the user performs modifications to hierarchical list 62. If there is no request for a modification at step 240, computer program 42 determines whether there is a request for closing interactive user interface 60 at step 244. If there is no request for closing interactive user interface 60 at step 244, computer program 42 returns to step 240. Once there is a request for closing interactive user interface 60 at step 244, computer program 42 updates accessed data file 48 at step 246 and determines whether there is a request for hierarchical graph 54 at step 248. Step 248 will also occur if there is no request for interactive user interface 60 at step 232.

At step 248, computer program 42 determines whether there is a request for hierarchical graph 54. If there is no request for hierarchical graph 54 at step 248, computer program 42 closes accessed data file 48 at step 250 and returns to step 204. If, however, there is a request for hierarchical graph 54 at step 248, computer program 42 generates hierarchical graph 54 of the information technology infrastructure of the organization at step 254. At step 258, computer program 42 displays hierarchical graph 54 on display device 20. Next, computer program 42 determines whether there is a request for hard copy output 52 that presents hierarchical graph 54 at step 262. If there is no such request, computer program 42 proceeds to step 250. However, if there is such a request, computer program 42 and output device 50 cooperate to generate hard copy output 52, which presents hierarchical graph 54, at step 266. After step 266, computer program 42 closes accessed data file 48 at step 250 and returns to step 204.

Although the information technology infrastructure of the organization has been illustrated as having five element types, each element type representing a different level of the infrastructure, system 10 can readily accommodate any number and combination of element types to represent the information technology infrastructure. For example, a new element type could be inserted under the entry type "Application" to specify subprograms of the application, thus creating six levels in the infrastructure. Therefore, system 10 contemplates any number of levels for representing the information technology infrastructure of an organization.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. Information technology infrastructure management software, embodied in a computer-readable medium and operable, when executed, to:
   generate a hierarchical graph of information technology elements categorized according to one or more organizational elements of a business entity with which each information technology element is associated;
   label each occurrence of an information technology element that occurs more than once in the hierarchical graph with a label that locates the occurrence of the information technology element in the hierarchical graph; and
   provide cross-references at each occurrence of the information technology element to the other occurrences of the information technology element in the hierarchical graph;
   wherein the hierarchical graph represents the information technology infrastructure of the business entity.

2. The software of claim 1, wherein the organizational elements comprise departments of the business entity.

3. The software of claim 1, further operable to:
   maintain a dependency relationship between a first information technology element and a second information technology element; and
   connect the second information technology element to each occurrence of the first information technology element.

4. The software of claim 1, wherein the information technology elements comprise applications and databases.

5. A system for representing the information technology infrastructure of a business entity, comprising:
   a memory operable to store data representing information technology elements of the business entity, organizational elements of the business entity with which each information technology element is associated, and relationships between the information technology elements and the organizational elements;
   a processor coupled to the memory and operable to:
     access the data in the memory; and
     generate a hierarchical graph of the information technology elements categorized according to one or more organizational elements of the business entity with which each information technology element is associated, wherein:
       each occurrence of an information technology element that occurs more than once In the hierarchical graph has a label that locates the occurrence of the information technology element in the hierarchical graph; and
       each occurrence of the information technology element cross-references the other occurrence of the information technology element in the hierarchical graph; and
   a display device coupled to the processor, the display device operable to display the hierarchical graph, wherein the hierarchical graph represents the information technology infrastructure of the business entity.

6. The system of claim 5, wherein the organizational elements comprise departments of a business entity.

7. The system of claim 5, wherein the information technology elements comprise applications and databases.

8. The system of claim 5, further comprising an output device coupled to the processor, the output device operable to generate a hard copy out that presents the hierarchical graph.

9. The system of claim 5, wherein:
   memory is further operable to store a dependency relationship between a first information technology element and a second information technology element; and
   the processor is further operable to connect the second information technology element to each occurrence of the first information technology element.

10. A method performed on a computer for representing the information technology infrastructure of a business entity, comprising:
    storing data representing information technology elements of the business entity, organizational elements of the business entity with which each information technology element is associated, and relationships between the information technology elements and the organizational elements;
    accessing the data in a memory;
    generating a hierarchical graph of the information technology elements categorized according to one or more organizational elements of the business entity with which each informational technology element is associated, the hierarchical graph comprising;
    labels that locate each occurrence of an information technology element that occurs more than once in the hierarchical graph: and
    cross-references at each occurrence of the information technology element in the to the other occurrences of the information technology element in the hierarchical graph; and
    displaying the hierarchical graph on a display device;
    wherein the hierarchical graph represents the information technology infrastructure of the business entity.

11. The method of claim 10, wherein the organizational elements comprise departments of a business entity.

12. The method of claim 10, wherein the information technology elements comprise applications and databases.

13. The method of claim 10, further comprising:
    maintaining a dependency relationship between a first information technology element and a second information technology element; and
    connecting the second information technology element to each occurrence of the first information technology element.

* * * * *